Sept. 28, 1965   R. S. OWENS   3,208,941
OLEFIN-UNSATURATED ESTER LUBRICANTS
Filed March 19, 1962
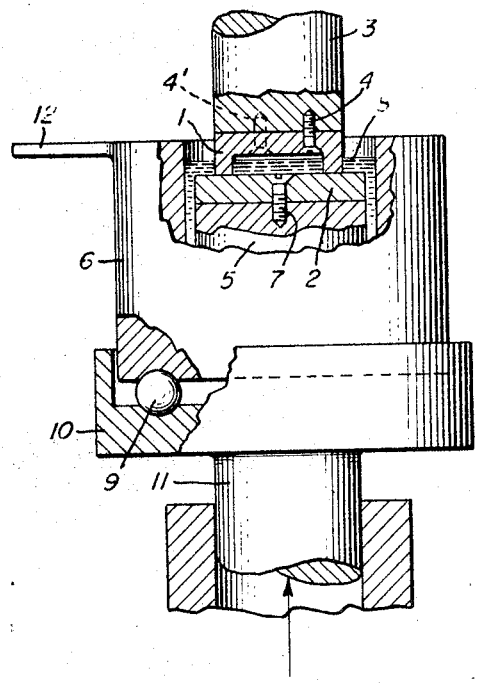
Inventor:
Robert S. Owens,
by Joseph T. Cohen
His Attorney.

ered Sept. 28, 1965

3,208,941
OLEFIN-UNSATURATED ESTER LUBRICANTS
Robert S. Owens, Latham, N.Y., assignor to General
Electric Company, a corporation of New York
Filed Mar. 19, 1962, Ser. No. 180,885
10 Claims. (Cl. 252—45)

The present invention relates to improved lubricants and to the use of these materials as lubricants for various contacting metallic surfaces, particularly aluminum surfaces. More particularly, the invention relates to a new class of lubricants and surfaces lubricated with such lubricants in which one of the surfaces is a metal composition, the said lubricants comprising a mixture of ingredients containing (1) a long chain olefin having the formula (I)

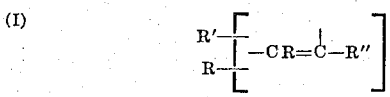

where R and R' are monovalent radicals selected from the class consisting of hydrogen and fluorine, and additionally R' is selected from the class consisting of the methyl, fluoromethyl, difluoromethyl, and trifluoromethyl radicals, and R'' is a monovalent straight chain saturated aliphatic radical selected from the class consisting of linear alkyl radicals and linear fluoroalkyl radicals each having at least 8 carbon atoms, and (2) an organic compound corresponding to the general formula (II)                     QXZ where Q is a monovalent straight chain saturated aliphatic radical of from 8 to 10 carbon atoms, with the provision, however, that where Q is 8, the olefin compound of Formula I must contain at least 14 carbon atoms, X is a divalent radical selected from the group consisting of oxy (—O—), thio (—S—), $$\text{carbonyl } (-\overset{O}{\underset{\|}{C}}-), \text{ carbonate } (-O-\overset{O}{\underset{\|}{C}}-O-), \text{ carbonyloxy } [-O-\overset{O}{\underset{\|}{C}}-$$

(which is intended to include the mirror-imaged $-\overset{O}{\underset{\|}{C}}-O-$ radical)]

$$\text{sulfoxy } (-\overset{O}{\underset{\|}{S}}-), \text{ and sulfonyl } (-\overset{O}{\underset{\|}{\underset{O}{S}}}-). \text{ X and Z together represent}$$

the monovalent group —XZ which encompasses the radicals —OZ, —SZ $$-\overset{O}{\underset{\|}{C}}-Z, -O-\overset{O}{\underset{\|}{C}}-OZ, -O-\overset{O}{\underset{\|}{C}}-Z, -\overset{O}{\underset{\|}{C}}-OZ, -\overset{O}{\underset{\|}{S}}-Z \text{ and } -\overset{O}{\underset{\|}{\underset{O}{S}}}-Z$$

where Z is a monovalent unsaturated aliphatic radical of the formula (III)

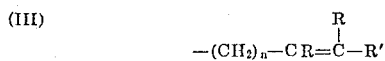

where R and R' are the same as for the olefin compound of Formula I and $n$ is a whole number of from 0 to 1, both inclusive.

The above lubricants have been found to be especially useful in those cases where new metal surfaces are being created or where high wear is a problem, particularly in cases of boundary lubrication. These lubricants may be used either alone or as additives in combination with other well known lubricating materials having the desired lubricating viscosities such as mineral oils, silicone oils, diester lubricants, etc.

Attempts have been made in the past to effect lubrication of aluminum surfaces. Thus, it has been desired to effect lubrication of relatively moving surfaces in which one of the surfaces is a metal composition containing at least 50% by weight aluminum, for instance, pure aluminum, alloys of aluminum, etc. The lubrication of such aluminum surfaces is especially difficult in cases where extreme pressure conditions exist requiring lubrication under boundary conditions, i.e., actual solid-to-solid contact, for instance, as may be found in a bearing before a hydrodynamic film of lubricant is created or where new solid surfaces are being generated, for example, in the shaping of a metal wire by drawing through a die, in the cutting of aluminum metal, for example, in a lathe or punch-press, the shaping of aluminum metal, for example, by stamping, drawing, extrusion, spinning, cold-rolling, etc. For convenience, this type of lubrication is hereinafter referred to as boundary lubrication. Under such conditions, it has been found that aluminum compositions are lubricated with great difficulty due to the fact that under extreme pressure conditions of boundary lubrication, the aluminum surface tends to score, gall, or seize, even when great care is exercised. To the best of my knowledge, no previous lubricant has been known which completely satisfies the requirements of boundary lubrication of aluminum metal compositions containing at least 50% by weight aluminum.

For purposes of brevity, the term "aluminum" or "aluminum composition" is intended to include not only aluminum itself, but also compositions in which the aluminum is present in an amount equal to at least 50% of the total weight of the composition, as, for instance, aluminum alloys, etc.

Unexpectedly, I have discovered that a mixture of a long-chain olefin of Formula I, and an organic polar-group-containing compound of Formula II (hereinafter referred to as "polar compound") can be used as lubricants between two solid surfaces which move relative to each other, even under high pressure conditions, or they may be used as additives to other well known lubricants to impart improved boundary lubricating characteristics, of such lubricants as, for instance, those mentioned above, examples of which are mineral oils of lubricating viscosity, lubricating greases, silicone lubricating oils, diester lubricating oils, polyester lubricants, silicate ester lubricants, etc. When these lubricants are employed in lubricating an aluminum surface, it is found that the coefficient of friction is greatly reduced, and the tendency to gall or seize, particularly under boundary lubrication conditions, is materially reduced and in many instances is eliminated. Furthermore, it is found that in addition to the improved lubricating characteristics obtained with this lubricating mixture, the act of one surface moving across another surface in the presence of these compositions imparts a high polish to the aluminum surface in many applications, thereby still further increasing the ease with which my lubricating compositions can contribute to the lubricating act.

In addition to my lubricating compositions being especially adaptable for lubricating relatively moving surfaces at least one surface of which is an aluminum surface, these lubricating compositions are unexpectedly also useful in effecting improved lubrication of other solid surfaces moving relative to each other, especially when one of these surfaces is a metal used for fabricating structural shapes, for example, iron, molybdenum, silver, copper, beryllium, tungsten magnesium, titanium, zirconium, chromium, nickel, cobalt, aluminum, tin, etc., and various metal compositions, for example, alloys of the aforesaid metals, of which typical examples are steels, brasses, the various alloys of magnesium, cobalt, zinc, zirconium, beryllium, iron (e.g., stainless steel), etc. The other surface may be the same or different metal, or it may be another solid material for example, wood, molded synthetic resins, laminates, etc., or a special compounded composition, such as, porous metal, graphite, graphite-impregnated metal, soft bearing alloys, e.g., babbitts, etc., or very hard compositions, for example, metal carbides, nitrides, etc.

The fact that my mixture of the olefinic compound and the polar compound could be used as lubricants for these various metals and are particularly useful as lubricants under a wide variety of conditions for two solid surfaces moving relative to each other where at least one of the surfaces is aluminum or an alloy of aluminum, was entirely unexpected and in no way could have been predicted because the prior art has been of the impression that the usual lubricants and the usual lubricating materials and techniques should not affect the lubricants under many conditions for relatively moving surfaces in which one of the surfaces is aluminum or one of its many alloys. This is particularly borne out by a recent article by R. D. Guminski and J. Willis entitled "Development of Cold-Rolling Lubricants for Aluminum Alloys," in Journal of the Institute of Metals, 88, pages 481–492 (1960), where the authors point out the undesirability of having unsaturated additives as lubricants in the cold-rolling of aluminum alloys.

It was also unexpected to find that my compositions were effective as lubricants, particularly for aluminum, because in my copending application with Leon E. St. Pierre, Serial No. 101,918, filed April 10, 1961, and now abandoned, the said application being assigned to the same assignee as the present invention, we had found that when employing olefinic compounds of Formula I with saturated esters described in our application Serial No. 101,918, e.g., methyl stearate, the alcohol portion of the ester had to be limited to at most three straight chain carbon atoms; longer chain alcohol moieties increased the coefficient of friction and caused the coefficient to become quite erratic, while at the same time increasing the wear to a point where the surfaces being tested galled badly. It was, therefore, quite surprising to find that low coefficients of friction and low wear were attained by using an olefinic compound with the polar compounds containing long-chain alcohol moieties or other residues which Q represents in Formula II having chain lengths well in excess of three carbon atoms.

Included among the normal compounds (as contrasted to branched chain compounds) represented by Formula I are, for instance, decene-1, dodecene-1, tetradecene-1, dodecene-2, tetradecene-2, pentadecene-1, hexadecene-1 (cetene), octadecene-1, octadecene-2, 1-fluorotetradecene-1, 1,2-difluorotetradecene-1, 1-fluorohexadecene-1, trifluorohexadecene-1,1,1,2,2-tetrafluorohexadecene-2, etc., as well as mixtures of such olefins.

Among the groups which Q may be are for instance, n-octyl, n-nonyl, n-decyl. Among the radicals which Z may be are, for example, vinyl, $\alpha$-methylvinyl, allyl, methallyl, crotyl, 2-methallyl, 2-methylcrotyl, $\alpha$-fluorovinyl, 4,4-difluorocrotyl, 3,3-difluoroallyl, etc.

Examples of the compounds coming within the scope of Formula II are, for instance, octyl acrylate, octyl methacrylate, nonyl acrylate, nonyl methacrylate, decyl acrylate, decyl methacrylate, decyl crotonate, octyl 2-methyl crotonate, decyl $\alpha$-fluoroacrylate, octyl allyl ether, decyl crotyl ether, nonyl allyl sulfide, decyl crotyl sulfide, decyl allyl ketone, octyl allyl thioketone, nonyl crotyl ketone, decyl methallyl carbonate, decyl crotyl carbonate, decyl vinyl carbonate, decyl allyl sulfoxide, decyl crotyl sulfone, octyl allyl ether, nonyl 2-methylcrotyl sulfid vinyl pelargonate, allyl caproate, crotyl undecanate, all pelargonate, etc.

Although the proportions of the two ingredients can be varied widely, and significant improvements in lubricity between contacting surfaces are noted even when small amounts of the above mixture of the olefin and the polar compound are used, generally I prefer that the proportions of the two ingredients either used alone or when employed in combination with other lubricating material be such that they are a fluid mixture having a solidification temperature advantageously below room temperature, for example, below 15° C., thus making the lubricant useful over a broad spectrum of temperatures. In general, the olefin component advantageously is present in an amount equal to at least 30%, by weight, of the total weight of the olefin and the polar compound represented by Formula II. Thus, the olefin compound may represent on a weight basis, from 30 to 95% and the polar-containing compound from 5 to 70% of the total weight of the ingredients. Obviously, mixtures of the olefins and mixtures of the polar compounds may be used without departing from the scope of the invention.

Because of the ease of preparation, ready availability of raw materials for synthesis and their suitability and outstanding properties as lubricants and as additives to other well known lubricants, I prefer to use as the olefinic component one which is a straight chain unsaturated aliphatic hydrocarbon having olefinic unsaturation in the 1- or 2- positions of a chain length of from 12 to 20 carbon atoms. The other component of my lubricating composition conforming to Formula II is advantageously chosen from saturated long chain aliphatic esters of unsaturated aliphatic monocarboxylic acids in which the saturated aliphatic radical Q is from 8 to 10 carbon atoms, and the unsaturated portion (—XZ) is preferably either the acrylic acid radical or the crotonic acid radical.

The above mixture of ingredients can be used alone or can be mixed with other well known lubricants, for example, mineral oils of lubricating viscosity, greases made from such lubricating oils, silicone lubricating oils, diester lubricating oils, polyester lubricating oils, silicate ester lubricating oils, etc. My lubricants are particularly useful in lubricating solid surfaces which move relative to each other where one of the surfaces is aluminum. When one solid surface moves relative to another surface with a lubricant between the two surfaces, there may be a complete film of lubricant separating the two surfaces or there may be varying degrees of contact between the surfaces. The former condition exists under ideal hydrodynamic lubrication, while the latter condition is characteristic of boundary lubrication. Complete hydrodynamic lubrication may be obtained under certain ideal conditions found in bearings but is influenced by such factors as design of the two solid surfaces, load on the surfaces, and the relative speed of one part to the other. However, even under these conditions, boundary lubricating problems are encountered during stopping and starting operations, and from a practical standpoint, perfect hydrodynamic lubrication is approached rather than attained. Therefore, the ability of my lubricants to improve the boundary lubrication of solid surfaces moving relative to each other where one of the surfaces is aluminum, is a feature which has been greatly desired in the past.

In addition to my lubricants improving the lubricating characteristics of two solid surfaces where both surfaces are aluminum, it should also be understood that my lubricants are also useful in those cases where one of the surfaces is aluminum and the other surface is another solid material, as, for instance, various metals, or where both surfaces are metals other than aluminum, for example, iron, molybdenum, copper, tungsten, magnesium, zirconium, chromium, nickel, etc., alloys of said metals, such as the alloys of magnesium, aluminum, iron, zinc, etc. In addition, the other surface may be another solid material, for example, wood, molded synthetic resins, laminates, etc., or special compounded compositions such as porous metal, graphite, graphite impregnated metal, soft bearing alloys, e.g., babbitts, etc., or very hard compositions, for example, metal carbides, nitrides, etc.

A concentration of at least 20%, by weight, of my compositions in another lubricant will improve the boundary lubricating properties of the latter. Generally, for a solid surface of aluminum where the other surface moving relative to the first is also aluminum, the coefficient of friction is generally greatly improved where at least 50%, by weight, of the total lubricant constitutes the mixture of the olefinic material and the compound represented by Formula II above. On a weight basis I may use from 10 to 90 parts of my lubricant mixture per 100 parts of the other usual lubricant. This discovery permits the use of a wide variety of aluminum compositions for the first time, in the fabrication of bearings and like surfaces, since, as far as I am aware, prior to my invention, no way was satisfactorily known publicly to prevent galling and seizing of bearings made of aluminum. Although specific alloys of aluminum were made for bearings, the use of such compositions required concessions to be made as to the bearing clearances, life, etc., in order to provide adequate performance.

Likewise, my lubricating compositions permit aluminum materials to be shaped, for example, by drawing, spinning, extrusion and the like, with a very smooth finish. When my materials are used as the lubricant without dilution, the aluminum composition can be formed with a smooth, mirror-like finish which is difficult to obtain by the use of previously known lubricants. Typical examples of the various aluminum compositions (including aluminum alloys) that can be lubricated by my lubricants are those disclosed on pages 851–853 and 865–958 of Metals Handbook, Vol. 1, Properties and Selection of Metals, American Society for Metals, Novelty, Ohio, Eighth Edition (1961), for example, the high purity aluminum alloys which are greater than 99% aluminum, e.g., EC alloy, 1060 alloy, 1100 alloy, etc., alloys of aluminum with other metals, for example, copper, silicon, tin, zinc, etc., as are more fully described on pages 955–958 of the above reference.

Typical of the mineral or hydrocarbon oils of lubricating viscosity are the hydrocarbon lubricants obtained from petroleum. These products normally have viscosities in the range of 25 to 10,000 Saybolt Universal Seconds (S.U.S.), and may be a single mixture of hydrocarbons.

Typical of the silicone lubricating oils are those disclosed in, for example, U.S. Patents 2,410,346—Hyde; 2,456,496—Ford et al.; 2,469,888—Patnode; 2,469,890—Patnode; 2,970,162—Brown; etc.

Typical of the diester, polyester, and silicate ester lubricants are those disclosed in U.S. Patents 2,450,221—Ashburn et al.; 2,450,222—Ashburn et al.; U.S. Patent 2,977,301—Bergen et al.; and on pages 16–24 of Technical Publication No. 77, published by American Society for Testing Materials, Philadelphia, entitled, "Symposium on Synthetic Lubricants." Other lubricating materials, as well as suitable mixtures of these lubricating materials, may be used in the practice of my invention without departing from the scope of the invention.

The compositions of my invention covered by the above general formula vary from liquid to solid materials. The solids when dissolved in lubricating oils or fluids are capable of producing fluids and greases having improved lubricating properties depending on the composition and concentration.

To aid in obtaining the grease-like consistency desired for lubricating greases, non-abrasive fillers such as silica gel, carbon black, diatomaceous earth, molybdenum sulfide, tin sulfide, graphite, etc., may be added or soaps may be incorporated to produce a gel structure. Particularly useful soaps are the metallic soaps such as the alkali or alkaline earth soaps of the fatty acids, but other soaps may also be used, for example, zinc, tin, lead, copper, etc. soaps of the fatty acids. A particularly desirable grease composition may be made from lithium stearate or lithium hydroxy stearate. These grease compositions may be made by any of the well known methods, for example, as disclosed in U.S. Patents 2,450,221—Ashburn et al.; 2,450,222—Ashburn et al.; and 2,260,625—Kistler.

It will of course be apparent to those skilled in the art that in addition, pour depressants, stabilizers, inhibitors, particularly oxidation inhibitors, and the like, may be added to my lubricating compositions to impart to the latter the additional properties which these particular additives are designed for.

In order that those skilled in the art may better understand how the present invention may be practiced, the following examples are given by way of illustration and not by way of limitation. In all of the examples, the percentages are by weight.

The apparatus used to test my lubricants shown in the following examples under boundary lubricating conditions is described in the attached drawing, in which the single figure shows partly in section the portion of a standard four-ball wear tester which has been modified to evaluate lubricating compositions using metals in various shapes other than the balls.

This apparatus comprised a modified four-ball wear test machine described in an article by R. G. Larson, entitled, "Study of Lubrication Using Four-Ball Type Machine," Lubrication Engineering, 1, page 35, August, 1945. This machine was modified by replacing the four balls and their holder with a cup and washer, as shown in the figure. Rider 1, made of aluminum, is cup-shaped and is rotated at preselected speeds against stationary test washer 2 made also of aluminum by means of a motor driven shaft 3 to which rider 1 is attached by machine bolts 4 and 4'. Washer 2 is rigidly fastened to the base 5 of chamber 6 by means of machine bolt 7 through the medium of a rubber member designed to insure proper alignment between washer 2 and rider 1. A reservoir of lubricant 8 under test is maintained around the test pieces. Chamber 6 rides on a series of ball bearings, one of which is shown as 9, which ride upon member 10, which forms the uppermost portion of plunger 11, which is connected to a hydraulic system (not shown) to permit various loadings to be established between the two test samples 1 and 2. When rider 1 is rotated against test washer 2 by means of clockwise rotation of shaft 3, chamber 6 will rotate upon member 10 due to the frictional force existing between members 1 and 2. The force required to prevent such rotation is measured by a strain guage attached to arm 12. This modification permits the coefficient of friction to be calculated and examination of riders 1 and 2 permits evaluation of the amount and type of wear produced.

Using this apparatus, the following measurements were made in the following tests when the rider having a flat annular surface area of 0.393 square inch was rotated at 0.88 r.p.m. to give a surface speed of 0.0461 inch per second against the test washer using a load of 10 kg. These conditions represent operation in the boundary friction region and represent the most difficult condition of bearing operation from a lubricant standpoint. In these tests, both the rider and the washer were made of aluminum. All percentages are by weight and the tests were run at room temperature (about 22° C.) for 1 hour unless otherwise specified.

EXAMPLE 1

In the following example, mixtures of cetene (also known as α-hexadecylene or hexadecene-1) and either decyl acrylate, octyl acrylate, allyl pelargonate, or decyl methacrylate, in the proportions stipulated, were introduced as lubricant mixtures in the above-identified apparatus. Additionally, cetene, decene, decyl acrylate, decyl methacrylate, allyl pelargonate, and octyl acrylate were also tested alone to show the unexpected advantages of using the combination of an olefinic hydrocarbon conforming to Formula I and the composition conforming to Formula II. Finally, a mixture of octyl acetate and cetene, and a vegetable oil were also tested to show the effect of having no unsaturation as well as polyunsaturation in the ester molecule. This vegetable oil (specifically a corn oil) consisted essentially of glycerides of fatty acids containing, on a weight basis, acid residues of the following acids: 34 to 62 percent linoleic acid, 19 to 49 percent oleic acid, 0.2 to 1.6 percent hexadecenoic acid, 8 to 12 percent palmitic acid, and less than 5 percent of small amounts of myristic and stearic acids. In all the tests below, the washer and rider of the test apparatus were both aluminum. Table I shows the composition of the test lubricants, the proportions, the coefficient of friction, and the wear results obtained.

*Table I*

| Test No. | Lubricant | Average Coefficient of Friction | Remarks as to Surface Wear |
| --- | --- | --- | --- |
| 1 | 100% Cetene | 0.11 | Very high wear as though the surface were machined. |
| 2 | Vegetable Oil* | 0.27–0.38 | Galled badly. |
| 3 | 100% Decene-1 | 0.14 | Grooving of wear track. |
| 4 | Decyl acrylate | 0.20 | Grooved wear track in 30 minutes. |
| 5 | Octyl acrylate | 0.30 | Galled in 30 minutes. |
| 6 | Allyl pelargonate* | 0.32->0.68 | Badly galled in 30 minutes. |
| 7 | Decyl methacrylate | >0.68 | Badly galled after 30 minutes. |
| 8 | 70% Cetene, 30% Decyl Acrylate | 0.07–0.1 | Only slight wear after 5.5 hours; polished surface. |
| 9 | 70% Decene-1, 30% Decyl Acrylate | 0.14–0.17 | Very low wear; polished surface. |
| 10 | 36% Cetene, 70% Decyl Acrylate | 0.17 | Slight wear; polished surface. |
| 11 | 70% Cetene, 30% Octyl Acrylate | 0.12 | Do. |
| 12 | 70% Cetene, 30% Allyl pelargonate | 0.18–0.2 | Very low wear; polished surface. |
| 13 | 70% Cetene, 30% Decyl methacrylate | 0.17–0.21 | Do. |
| 14 | 70% Cetene, 30% Octyl acetate* | 0.15–0.24 | High wear; grooved surface. |
| 15 | 70% Decene, 30% Octyl Acrylate* | 0.12–0.2 | Very erratic. Twice the wear when using Cetene in Test 11. |

*At all times during the test the coefficient of friction was erratic and varied within the limits set forth.

The n-octyl acrylate and n-decyl acrylate are obtainable from Borden Chemical Company, 5000 Langdon Street, Philadelphia, Pa.

It will be clearly apparent that my compositions can be used not only in bearing applications where a shaft, for instance, is revolving in intimate contact with a stationary member, but they can also be employed in other applications as, for instance, in the cutting of aluminum, the extrusion, drawing and stamping of aluminum members, etc. Aluminum cans can be readily drawn to be used for capacitor casings. Furthermore, billets of aluminum can be passed through dies and the diameter of the billets greatly reduced in size to give aluminum wire which has a shiny appearance and, because of the smooth surfaces of the aluminum, reflects the advantageous lubricating characteristics of my lubricating compositions.

It will also be apparent to those skilled in the art that, instead of the particular olefins and the polar compounds used in the foregoing tests, other olefins and compounds conforming to Formula II may be used without departing from the scope of the invention. The proportions of ingredients can of course be varied widely, and other lubricating compositions, many examples of which have been given above, can be combined with my mixture of ingredients comprising the olefinic compound and the compounds of Formula II to give compositions of matter having utility in the lubricating art, particularly under boundary lubricating conditions.

What I claim as new and desire to secure by Letters Patent of the United States is:

1. A lubricant comprising on a weight basis (a) from 5 to 95% of an olefin of from 12 to 20 carbon atoms having the formula

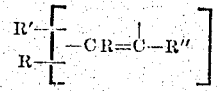

and (b) from 95 to 5% of a compound having the formula

Q—X—Z where R is a monovalent radical selected from the class consisting of hydrogen and fluorine, R' is a monovalent radical selected from the class consisting of hydrogen, fluorine, methyl, monofluoromethyl, difluoromethyl, and trifluoromethyl, R" is a monovalent linear, straight-chain alkyl radical selected from the class consisting of linear alkyl and linear fluoroalkyl radicals each radical having at least 8 carbon atoms, X is a divalent radical selected from the group consisting of —O—, —S—,

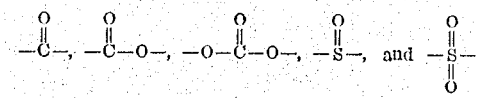

Z is monovalent unsaturated aliphatic radical of the formula

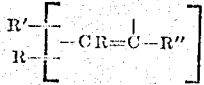

where R and R' have the meanings above and $n$ is a whole number from 0 to 1, and Q is a monovalent, straight-chain alkyl radical of from 8 to 10 carbon atoms, with the provision that where Q is 8 carbons, the olefin compound contains at least 14 carbon atoms.

2. A lubricating composition comprising, by weight, from 5 to 95% decyl acrylate and from 95 to 5% cetene.

3. A lubricating composition comprising, by weight, from 5 to 95% decyl acrylate and from 95 to 5% decene-1.

4. A lubricating composition comprising, by weight, from 5 to 95% octyl acrylate and 95 to 5% cetene.

5. A lubricating composition comprising a mixture of ingredients containing, on a weight basis, (1) 100 parts of a lubricating fluid selected from the class consisting of silicone, diester, hydrocarbon, polyester, and silicate ester lubricating fluids, and (2) from 10 to 90 parts of a mixture of ingredients comprising on a weight basis (a) from 5 to 95% of an olefin of from 12 to 20 carbon atoms having the formula

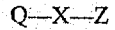

and (b) from 95 to 5% of a compound having the formula $$Q-X-Z$$

where R is a monovalent radical selected from the class consisting of hydrogen and fluorine, R' is a monovalent radical selected from the class consisting of hydrogen fluorine, methyl, monofluoromethyl, difluoromethyl, and trifluoromethyl, R" is a monovalent linear straight-chain alkyl radical selected from the class consisting of linear alkyl and linear fluoroalkyl radicals each radical having at least 8 carbon atoms, X is a divalent radical selected from the group consisting of —O—, —S—,

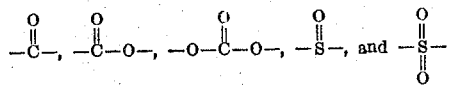

Z is a monovalent unsaturated aliphatic radical of the formula

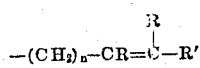

where R and R' have the meanings above and $n$ is a whole number from 0 to 1, and Q is a monovalent, straight-chain alkyl radical of from 8 to 10 carbon atoms, with the provision where Q is 8 carbons, the olefin compound contains at least 14 carbon atoms.

6. A lubricating composition comprising a mixture of ingredients containing, on a weight basis, 100 parts of a lubricating fluid selected from the class consisting of silicone, diester, hydrocarbon, polyester, silicate ester lubricating fluids, and from 10 to 90 parts of a mixture of ingredients comprising on a weight basis (a) from 5 to 95% decyl acrylate and (b) from 95 to 5% cetene.

7. The method of lubricating two solid surfaces between which there is relative motion, at least one of said surfaces being a metal selected from the class consisting of aluminum and alloys of aluminum, which comprises maintaining between the two surfaces a composition of matter comprising on a weight basis (a) from 5 to 95% of an olefin of from 12 to 20 carbon atoms having the formula

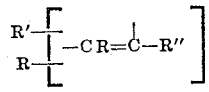

and (b) from 95 to 5% of a compound having the formula $$Q-X-Z$$

where R is a monovalent radical selected from the class consisting of hydrogen and fluorine, R' is a monovalent radical selected from the class consisting of hydrogen fluorine, methyl, monofluoromethyl, difluoromethyl, and trifluoromethyl, R" is a monovalent linear, straight-chain alkyl radical selected from the class consisting of linear alkyl and linear fluoroalkyl radicals each radical having at least 8 carbon atoms, X is a divalent radical selected from the group consisting of —O—, —S—,

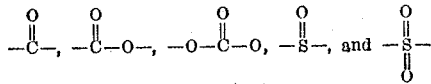

Z is a monovalent unsaturated aliphatic radical of the formula

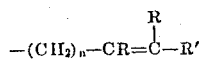

where R and R' have the meanings above and $n$ is a whole number from 0 to 1, and Q is a monovalent straight-chain alkyl radical of from 8 to 10 carbon atoms, with the provision that where Q is 8 carbons, the olefin compound contains at least 14 carbon atoms, and thereafter effecting motion between the two solid surfaces with the mixture of ingredients therebetween.

8. The method of lubricating two solid surfaces between which there is relative motion, at least one of said surfaces being a metal selected from the class consisting of aluminum and alloys of aluminum, which comprises maintaining between the two surfaces a mixture of ingredients comprising on a weight basis (a) 5 to 95% decyl acrylate and (b) from 95 to 5% cetene, and thereafter effecting motion between the two solid surfaces with the mixture of ingredients therebetween.

9. The method of lubricating two solid surfaces between which there is relative motion, at least one of said surfaces being a metal selected from the class consisting of aluminum and alloys of aluminum, which comprises maintaining between the two surfaces a mixture of ingredients comprising on a weight basis (a) 5 to 95% decyl acrylate and (b) from 95 to 5% decene-1, and thereafter effecting motion between the two solid surfaces with the mixture of ingredients therebetween.

10. The method of lubricating two solid surfaces between which there is relative motion, at least one of said surfaces being a metal selected from the class consisting of aluminum and alloys of aluminum, which comprises maintaining between the two surfaces a mixture of ingredients comprising on a weight basis (a) 5 to 95% octyl acrylate and (b) from 95 to 5% cetene, and thereafter effecting motion between the two solid surfaces with the mixture of ingredients therebetween.

References Cited by the Examiner
UNITED STATES PATENTS

| | | | |
|---|---|---|---|
| 2,204,597 | 6/40 | Humphreys et al. | 252—56 X |
| 2,257,969 | 10/41 | Loane et al. | 252—48.2 |
| 2,500,165 | 3/50 | Doherty et al. | 252—59 X |
| 2,659,252 | 11/53 | Kipp | 252—11 X |
| 3,076,791 | 2/63 | Hollyday et al. | 252—56 X |

DANIEL E. WYMAN, *Primary Examiner.*